Patented Feb. 24, 1942

2,273,905

UNITED STATES PATENT OFFICE 2,273,905

OXIDES OF SUBSTITUTED PHENOTHIOXINS

Frank B. Smith and Harold W. Moll, Midland, Mich., assignors to The Dow Chemical Company, Midland, Mich., a corporation of Michigan No Drawing. Application May 24, 1939,
Serial No. 275,506

4 Claims. (Cl. 260—327)

This invention relates to the oxidation products of cycloalkylated phenothioxins and is particularly concerned with those compounds having the formula

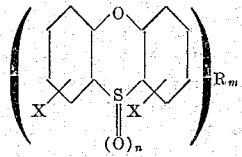

wherein R represents a cycloalkyl group, each X represents halogen, alkyl containing from 1 to 8 carbon atoms, inclusive, phenyl or hydrogen, $n$ is 1 or 2, and $m$ represents an integer, not greater than 2. The term "cycloalkyl" as herein employed includes such groups as cyclobutyl, cyclopentyl, cyclohexyl, methyl-cyclohexyl, chlorocyclohexyl, isopropyl-methyl-cyclohexyl, cyclohexyl-cyclohexyl, phenyl-cyclohexyl radicals and the like.

Representative compounds defined by the foregoing formula have been prepared and found to be white, crystalline compounds or viscous oils, substantially insoluble in water and somewhat soluble in common organic solvents. These compounds and mixtures thereof are useful as modifiers for plastic materials, intermediates, and in certain instances as insecticidal toxicants.

The cycloalkylated phenothioxin-oxides and dioxides may be prepared by dissolving the corresponding phenothioxin compound in a suitable solvent, and treating the mixture with an oxidizing agent.

In carrying out the reaction to prepare a 10-oxide, the phenothioxin compound, solvent, and an oxidizing agent, such as nitric acid, are mixed together and warmed to a reaction temperature with stirring. The preferred reaction temperatures fall with in the range of 50°–125° C., although somewhat higher or lower temperatures may be employed. Following completion of the oxidation reaction, the mixture may be diluted with water to precipitate the cycloalkylated phenothioxin-oxide, which may then be separated and subjected to recrystallization, decolorization with absorptive materials such as bone charcoal, or other standard purification methods. While the exact proportions of reactants are not critical, an appreciable excess of the nitric acid is generally employed.

In preparing the cycloalkylated phenothioxin-10-dioxides, an analogous procedure is followed, except that oxidizing agents, such as hydrogen peroxide, are employed. In carrying out this reaction, at least two molecular equivalents of the hydrogen peroxide per molecular equivalent of the phenothioxin compound are employed.

The cycloalkylated phenothioxins employed as intermediates in the preparation of the oxides and dioxides are conveniently prepared by the reaction of the corresponding substituted diphenyl-oxide with sulphur in the presence of aluminum chloride catalyst. An alternate procedure consists of condensing cycloalkenes, cycloalkyl halides, or hydroxy-cycloalkanes with phenothioxins or halo, alkyl, or phenyl derivatives thereof in the presence of an acid activated bleaching earth as catalyst. The preparation of a number of these intermediates is described in our co-pending application Serial No. 272,817, filed May 10, 1939.

The following examples set forth certain embodiments of the invention, but are not to be construed as limiting the same.

Example 1

25 grams (0.088 mole) of a monocyclohexyl-phenothioxin product (boiling at 232°–238° C. at 20 millimeters pressure), 10 milliliters (0.157 mole) of 70 per cent nitric acid, and 130 grams (2.18 moles) of glacial acetic acid were mixed together and heated at 95° C. for 25 minutes. The reaction mixture was then poured into 400 milliliters of cold water, whereby a viscous oil was precipitated. This crude product was separated, taken up in alcohol, and washed by reprecipitation in water. Upon separation and drying, there was obtained a substantially quantitative yield of a monocyclohexyl-phenothioxin-10-oxide product as a fluorescent, red, viscous oil, insoluble in water, somewhat soluble in common organic solvents, and having a refractive index of $$1.6151 \frac{60° \text{ C.}}{D}$$

Example 2

In a similar manner, 22.3 grams (0.062 mole) of monocyclohexyl-1-phenyl-phenothioxin product (boiling at 215°–250° C. at 3.5 millimeters pressure), 5 milliliters (0.078 mole) of 70 per cent nitric acid, and 78 grams (1.3 moles) of glacial acetic acid were mixed together and heated at 95° C. for 1 hour. When poured into an excess of water, the reaction product was precipitated as a viscous oil. This product was separated and dried to obtain a monocyclohexyl-1-phenyl-phenothioxin-10-oxide product as an oily, fluorescent liquid, substantially insoluble in water and soluble in most organic solvents.

Example 3

10 grams of monocyclohexyl-3-chloro-phenothioxin product (boiling at 215°–231° C. at 4 millimeters pressure), 2.5 milliliters (0.039 mole) of 70 per cent nitric acid, and 36.4 grams (0.61 mole) of glacial acetic acid were similarly reacted at 95° C. and over a period of 20 minutes. At the end of this time, the crude reaction mixture was diluted with an excess of cold water and the resulting oily precipitate separated and washed, as described in Example 1. A mixture of monocyclohexyl - 3 - chloro - phenothioxin-10-oxides was thereby obtained as a viscous, fluorescent, red oil, substantially insoluble in water but somewhat soluble in organic solvents.

Example 4

25 grams (0.088 mole) of the monocyclohexyl-phenothioxin fraction described in Example 1, 30 grams (0.265 mole) of 30 per cent hydrogen peroxide, and 130 grams (2.18 moles) of glacial acetic acid were mixed together and heated with stirring at 95° C. for 2 hours. The crude reaction product was poured into an excess of cold water to separate out the oily product. This was recovered from the mixture by decantation, taken up with alcohol, and purified by reprecipitation, whereby there was obtained a mixture of monocyclohexyl-phenothioxin-10-dioxides as a light yellow, viscous, fluorescent oil, insoluble in water, soluble in many organic solvents, and having a refractive index of $$1.5938 \frac{60° \text{ C.}}{D}$$

Example 5

In a similar reaction, 10 grams (0.0316 moles) of the monocyclohexyl-3-chloro-phenothioxin product employed in Example 3, 8 grams (0.07 mole) of 30 per cent hydrogen peroxide, and 36.5 grams (0.61 mole) of glacial acetic acid were heated together for 1 hour at 110° C. The crude reaction product partially solidified when diluted with water. The precipitated material was taken up in alcohol and fractionally crystallized, whereby there was obtained a monocyclohexyl-3-chloro-phenothioxin-10-dioxide product in the form of white crystalline plates melting at 195°–196° C.

Example 6

Similarly, 22.3 grams (0.062 mole) of the monocyclohexyl-1-phenyl-phenothioxin fraction of Example 2, 15 grams (0.132 mole) of 30 per cent hydrogen peroxide, and 78 grams (1.3 moles) of glacial acetic acid were reacted together for ½ hour at 95° C. The product obtained by precipitation and recrystallization from ethyl alcohol consisted of monocyclohexyl-1-phenyl-phenothioxin-10-dioxide as a white, crystalline compound melting at 82°–84.5° C.

Other cycloalkylated phenothioxin compounds may be substituted for those shown in the examples to obtain the corresponding oxide and dioxide compounds. Representative of the compounds which may be so employed as intermediates are: mixed dicyclohexyl-phenothioxin, boiling at 300°–360° C. at 3.5 millimeters pressure; dicyclohexyl-3-chloro-phenothioxin, boiling at 260°–270° C. at 3–5 millimeters pressure; mixed dicyclohexyl-1-phenyl-phenothioxins, boiling at 270°–330° C. at 3.5 millimeters pressure; monocyclohexyl-monopropyl-phenothioxin; monocyclohexyl-diethyl-phenothioxin; monocyclohexyl-2,7-dimethyl-phenothioxin; monocyclohexyl-2,7-dichloro-phenothioxin; dicyclohexyl-3-bromo-phenothioxin; monocyclohexyl-6-chloro-3-methyl-phenothioxin; monocyclobutyl-3-methyl-phenothioxin; monocyclopentyl-3-phenyl-phenothioxin; (2-methyl-5-isopropyl-cyclohexyl) 2-phenyl-7-chloro-phenothioxin; di-(2-methyl-cyclohexyl) 6-iodo-3-methyl-phenothioxin; di-(4-chloro-cyclohexyl)-phenothioxin; monocyclohexyl-octyl-phenothioxin; cyclohexyl-cyclohexyl phenothioxin; phenyl-cyclohexyl phenothioxin; and the like. Both 10-oxides and 10-dioxides may be obtained from the foregoing and related compounds by operation in accordance with the methods disclosed above.

While the examples disclosed the reaction of nitric acid or hydrogen peroxide with phenothioxin derivatives dissolved in glacial acetic acid, other oxidizing agents, such as sodium chromate, potassium permanganate, chromic acid, sodium hypochlorite, and the like, may be employed. Similarly, other solvents such as acetic anhydride, concentrated sulphuric acid, and the like may be substituted for the glacial acetic acid.

In a companion application, filed concurrently herewith, the preparation and properties of the oxides and dioxides of phenothioxins substituted by phenyl and alkyl radicals are described. This application is Serial No. 275,507.

Other modes of applying the principle of our invention may be employed instead of those explained, change being made as regards the materials employed, provided the products described in the following claims be thereby obtained.

We therefore particularly point out and distinctly claim as our invention:

1. A compound having the formula:

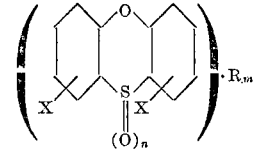

wherein R represents a cycloalkyl group, each X represents a member of the group consisting of phenyl, alkyl containing from 1 to 8 carbon atoms, inclusive, halogen, and hydrogen, and $m$ and $n$ are integers not greater than 2.

2. A compound having the formula:

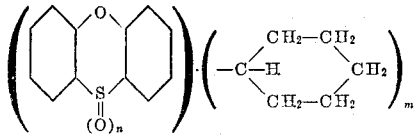

wherein $m$ and $n$ are integers not greater than 2.

3. A compound having the formula:

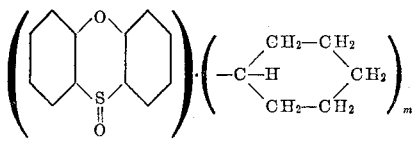

wherein $m$ is an integer not greater than 2.

4. A compound having the formula:

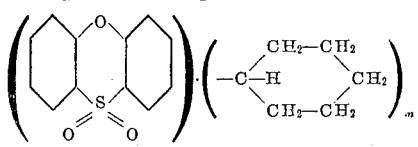

wherein $m$ is an integer not greater than 2.

FRANK B. SMITH.
HAROLD W. MOLL.